(12) United States Patent
Yoshimoto

(10) Patent No.: US 6,226,673 B1
(45) Date of Patent: May 1, 2001

(54) DATA DISTRIBUTION METHOD AND APPARATUS AND COMPUTER PROGRAM

(75) Inventor: Masahiko Yoshimoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/979,521

(22) Filed: Nov. 26, 1997

(30) Foreign Application Priority Data

Nov. 29, 1996 (JP) .................................................. 8-320560
Nov. 18, 1997 (JP) .................................................. 9-317455

(51) Int. Cl.[7] .............................................. G06F 15/173
(52) U.S. Cl. ...................... 709/223; 709/218; 709/242; 370/351; 370/400; 370/401
(58) Field of Search ................................. 709/200, 242, 709/223, 218, 227, 228, 231; 370/255, 245, 401, 220, 351, 400

(56) References Cited

U.S. PATENT DOCUMENTS 5,289,460 * 2/1994 Drake, Jr. et al. .................. 370/245
5,355,371 * 10/1994 Auerbach et al. .................. 370/255
5,444,699 * 8/1995 Watanabee ........................ 370/397
5,634,011 * 5/1997 Auerbach et al. .................. 709/242
6,091,720 * 7/2000 Be'dard et al. .................... 370/351

FOREIGN PATENT DOCUMENTS

0426911 * 6/1989 (EP) ...................................... 12/24

* cited by examiner

*Primary Examiner*—Krisna Lim
*Assistant Examiner*—Chuong Ho
(74) *Attorney, Agent, or Firm*—Morgan & Finnegan, LLP

(57) ABSTRACT

This invention is to autonomously control reduction of wide-area traffic by sharing the same stream among nodes while avoiding distribution route localization due to route selection at the network level, and efficiently distribute a real-time data stream maintaining a high quality. In a real-time data distribution control system for distributing real-time data such as image or audio data using a network, node devices having data transmission/reception/relay means are put into groups. When the real-time data distribution route is to be selected among the node groups, an upper node group is selected in units of transmission sources.

23 Claims, 16 Drawing Sheets

| NODE PATTERN | UPPER NODE GROUP |
|---|---|
| * | 10.10.1.1 |
| *.foo.co.jp | ng.foo.co.jp |
| 10.0.0.0 / 255.0.0.0 | ng.foo.co.jp |
| 10.1.0.0 / 255.255.0.0 | 10.1.1.1 |

FIG. 13

| NODE PATTERN | UPPER NODE GROUP | TUNNELING SERVER |
|---|---|---|
| * | 10.10.1.1 | |
| *.foo.co.jp | ng.foo.co.jp | 10.100.200.1 |
| 10.0.0.0 / 255.0.0.0 | ng.foo.co.jp | 10.100.200.1 |
| 10.1.0.0 / 255.255.0.0 | 10.1.1.1 | 10.100.200.2 |
| *.bar.co.jp | | 10.100.200.1 |

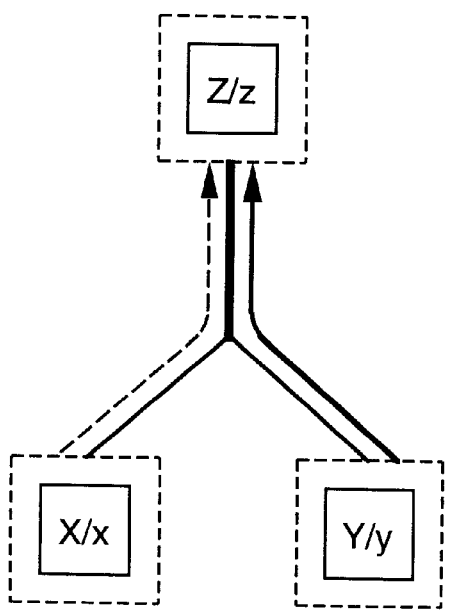
F I G. 16A
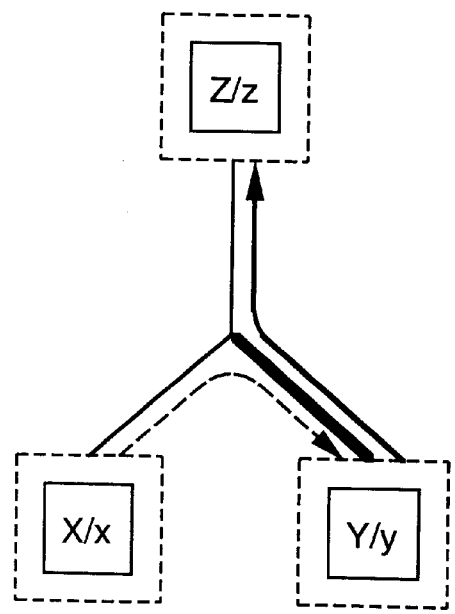
F I G. 16B

DATA DISTRIBUTION METHOD AND APPARATUS AND COMPUTER PROGRAM

BACKGROUND OF THE INVENTION

1. Field of the Invention

The present invention relates to a data distribution method and apparatus, and a storage medium and, more particularly, to a method of controlling distribution of real-time data such as image or audio data using a network, and a storage medium therefor.

2. Description of the Related Art

The present assignee has proposed a technique of connecting a camera server and a camera client on a network, transferring input live image data (sometimes including audio data) to the camera client which has connected to the camera server, and displaying the data (and outputting audio data) while freely controlling the camera angle.

When real-time image or audio data is to be distributed using a network, the receiving side adjusts the reproduction timing or discards unnecessary data blocks while evaluating the delay time and variations in delay time. Such time lag often occurs due to an overload on transmitting/receiving nodes or relay nodes, or the network which connects them. This tendency is especially conspicuous in a wide area network where network traffic rapidly charges, and generally, a sufficient bandwidth cannot always be ensured.

To efficiently distribute real-time image or audio data, the total traffic must be reduced to lessen the load of data distribution itself. To do this, the total traffic is reduced using broadcasting or multicasting, or corrupted data or unnecessary data due to a large delay is discarded. In real-time data distribution, it is most effective to select, as a distribution route from the transmitting node to the receiving node, entities meeting the requirement most.

Generally, in a conventional network service, the route from the transmitting node to the receiving node is selected by a relatively low-level routing means. In the Internet which is prevalent in recent years, TCP/IP is used as a network protocol. The route control means is based on a route control protocol such as RIP or BGP and a multicast group control protocol called IGMP. According to these means, when the transmitting node designates a receiving node for transmission, data is relayed through a gateway or router as needed. Physical packet transfer destinations between nodes are individually determined on the basis of given routing information, and finally, communication between arbitrary nodes is realized.

However, the low-level route selection means has the following problems.

Even when there are a plurality of routes from the transmitting node to the receiving node, it is not necessarily easy to select an optimum route in accordance with the purpose of service. The route selection mechanism itself is assisted as, e.g., source routing. In this case, however, the transit points to the receiving node must be listed on the transmitting node side. In a complex network, it is generally difficult for the transmitting node to grasp information of the entire route to the receiving node. In addition, flexibility of distribution control using relay nodes lowers. However, if source routing is not used, the distribution route is solely determined by the route control means, so selection of a route optimum for the service is not always guaranteed. Actually, many route control/information interpreting means select a route in which the number of effective relay nodes is minimum. However, it is obvious that such a means does not give an optimum route for real-time data distribution because it causes traffic congestion.

A more self-explanatory problem is that multicast distribution cannot always be used. The multicast function is prominent now, and many network devices are equipped with it. However, there still are a lot of incompatible devices, and only a few have a complete multicast function. Additionally, since multicast distribution requires resource assignment in relay nodes on a wide area of the network, establishment of a dynamic multicast distribution route is generally not warranted, as described above. In this case, as an alternative means, data distribution based on unicast is performed. This means cannot reduce the distribution load to result in a serious problem.

SUMMARY OF THE INVENTION

It is an object of the present invention to individually or generally solve the above problems.

It is another object of the present invention to provide a data distribution method and apparatus which enable effective data distribution to a plurality of nodes without increasing traffic on a network, and a computer program therefor.

It is still another object of the present invention to provide a real-time data distribution method which enables to put node devices associated with each individual data distribution into node groups, and appropriately select a distribution route among the node groups and a distribution route in each node group, thereby dynamically determining an appropriate real-time distribution route, and a storage medium therefor.

To solve the above problems, according to the present invention, there is provided a real-time data distribution control method of controlling distribution of real-time data using a network, wherein a source node, a relay node group constituted by one or a plurality or relay nodes, and a destination node are arranged, and when a transfer route of the real-time data from the source node to the destination node is to be set, nodes among the relay node groups and in each relay node group are managed, and the distribution route is dynamically set in accordance with the management.

It is still another object of the present invention to solve problems which arise when, in selecting nodes in a node group, a distribution route is gradually formed from the downstream (lower) side to the upstream (upper) side.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 10 is a table showing the structure of a lookup table used to select an inquiry destination upper node group;

FIG. 13 is a table showing the structure of a node group lookup table including firewall passage correspondence;

FIGS. 16A and 16B are views showing states wherein an upper node group is selected on the basis of the relative line capacity.

DETAILED DESCRIPTION OF THE PREFERRED EMBODIMENTS

The embodiments of the present invention will be described below in detail with reference to the accompanying drawings.

<First Embodiment>

Figure 1:
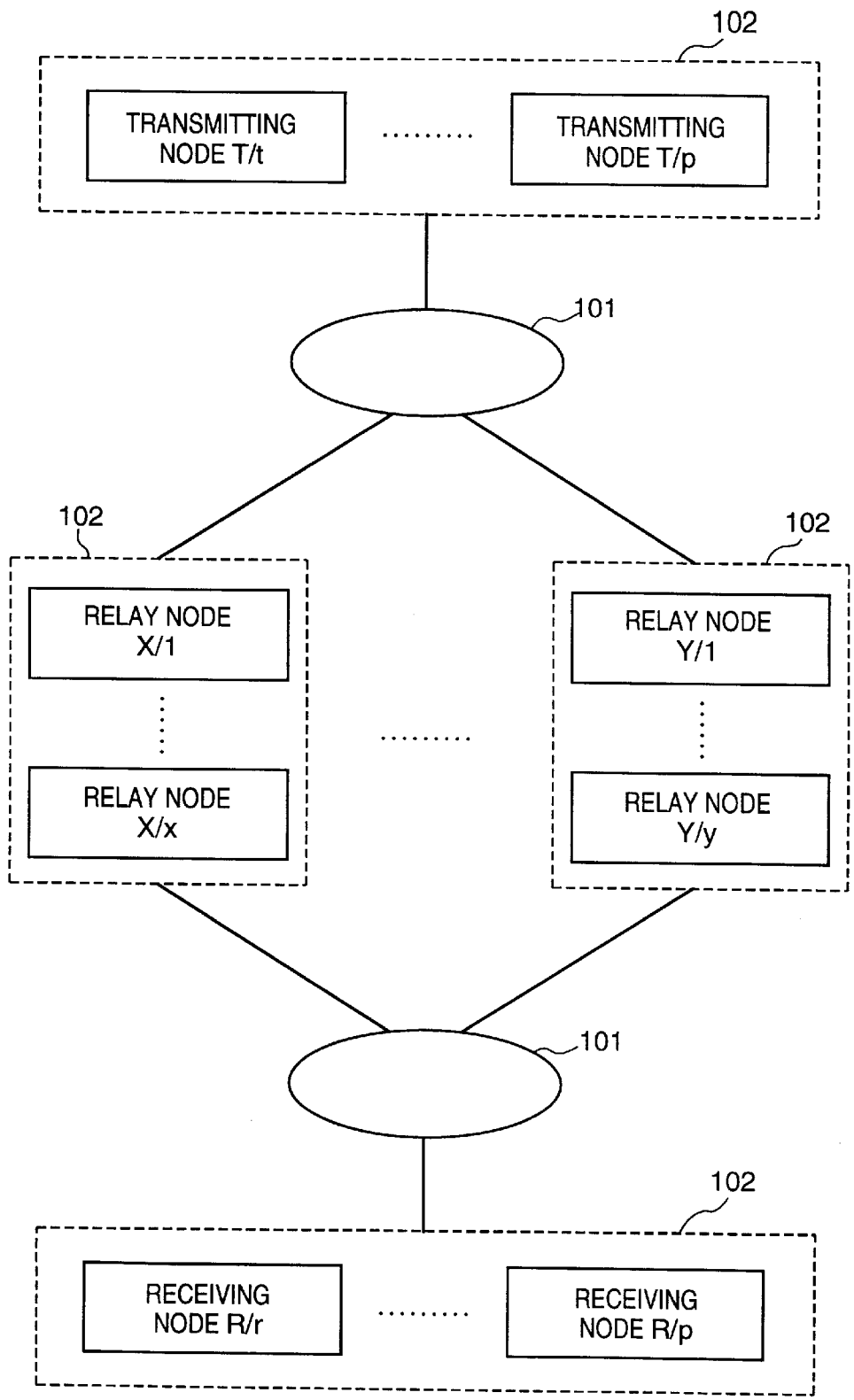
FIG. 1 is a view showing the arrangement of a network environment in the first embodiment.

FIG. 1 is a view showing the arrangement of a network environment used in the first embodiment. In FIG. 1, reference numeral 101 denotes a network to which a series of nodes to be described later are connected. This network comprises a large-scale network such as the Internet, an intermediate-scale network such as an intra-university or intra-company network, and a small-scale network such as a local area network.

Assume that this network includes internetwork connection generally using a router or a gateway, and routing control between nodes is performed by a known means.

Reference numeral 102 denotes a node group formed as an arbitrary combination of transmitting nodes, receiving nodes, or relay nodes. A node is a device for transmitting/receiving image or audio data, i.e., a computer system comprising a CPU, a main storage unit, an external storage unit, and input/output devices. A node group is formed from a series of nodes managed by a node group control means to be described later.

The node group arrangement is intentionally determined by, e.g., a network manager. Normally, a node group is constituted by a series of nodes connected to a position near the network, e.g., a network segment, or a series of nodes connected to each other via high-quality lines in a relatively wide band.

Each data such as image or audio data, and composite data containing image and audio data is referred to stream data, or simply, a stream. A node is classified into a transmitting node, a receiving node, or a relay node on the basis of its function in stream data distribution. A transmitting node generates stream data. This device has an image capture function or audio sampling function. A receiving node receives (stores/reproduces) stream data. This device has an image display function or audio reproducing function. A relay node relays stream data distribution. This device generally has a stream data processing function.

Each physical node device serves as a transmitting node for stream data of certain type, but it may serve as a receiving node or relay node for stream data of another type. In this embodiment, for the descriptive convenience, the stream data is preselected, and a transmitting node is represented as T/t; a receiving node, R/r; and a relay node, X/i. Symbol N/n represents a pair of node group identifier N and intra-node-group identifier n. A node group containing a relay node will be simply called a relay node group. This also applies to a transmitting node group and a receiving node group.

Stream data distribution route control is performed in units of node groups. A means for this operation is an inter-node-group control means. This means controls cooperation among node groups, i.e., the arrangement of a relay node group line arranged between the transmitting node group and the receiving node group. In the arrangement shown in FIG. 1, a stream data distribution route is formed between a transmitting node group T and a receiving node group R using a relay node group X or Y, or a combination thereof. The relay node group line may be null. In fact, if the transmitting node group T and the receiving node group R can be directly connected on the network, and the route selected at the network level has a sufficiently high quality, no relay node group line need be formed.

Stream data itself is distributed through a node selected in each node group on the distribution route. A means for selecting this node in the node group is an intra-node-group control means. When, in the arrangement shown in FIG. 1, the relay node group X is formed in the route from the transmitting node T/t to the receiving node R/r, the intra-node-group control means selects a relay node X/p as a node for distributing the stream data in the node group X. The intra-node-group control means also replicates or rearrange the relay node in accordance with changes in situation in the relay node group.

The inter-node-group control means comprises two means associated with the stream distribution route, i.e., a stream distribution route setting means and a stream distribution route updating means. The inter-node-group control means also has three means associated with stream distribution, i.e., a start means, a stop means, and a control means. These means will be sequentially described below.

Figure 2:
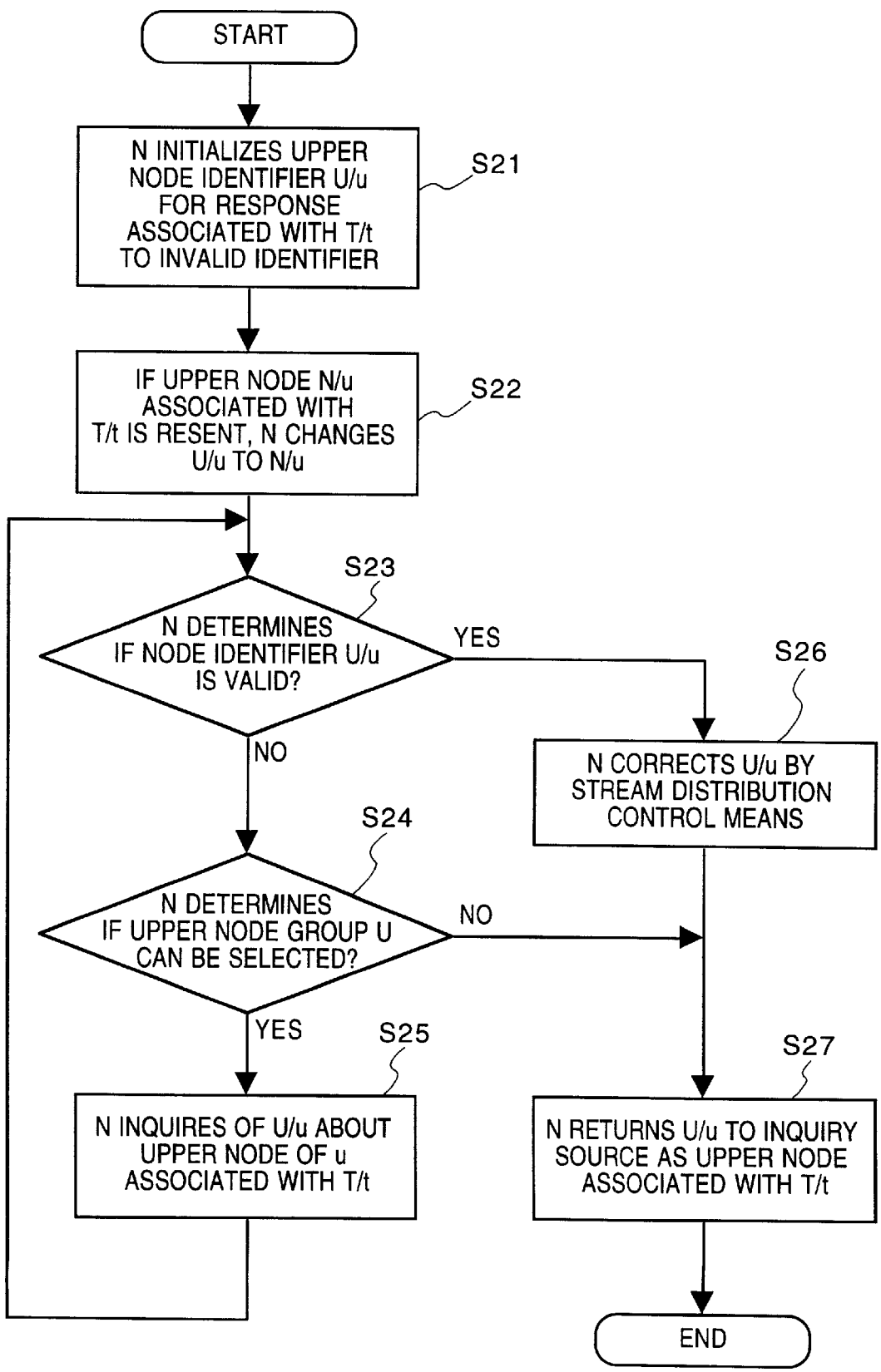
FIG. 2 is a flow chart showing the processing procedure of a stream distribution route setting means.

FIG. 2 is a flow chart showing the processing procedure of the stream distribution route setting means. Before stream data distribution in which the transmitting node T/t is a source node is requested, this processing procedure is used by a relay node or a receiving node in the node group N or a lower node group of the node group N to determine an upper node of the transmitting node T/t. An upper node identifier for responding the inquiry source is represented as U/u. This identifier is initialized first as an invalid node identifier (step S21).

Next, it is determined whether an upper node N/u of the transmitting node T/t is already present in the node group N. If an upper node N/u is present, the identifier U/u is changed to N/u (step S22). It is determined whether the identifier U/u is valid (step S23). If no upper node is present in the node group N, it is determined in step S23 that the node identifier U/u is still invalid, so the flow advances to the next step. More specifically, an upper node group of the node group N associated with the transmitting node group T is selected (step S24). If an upper node group U can be selected, an upper node U/u of the node group N associated with the transmitting node T/t is inquired of the upper node group U (step S25). The node group N acquires the upper node identifier U/u as a response from the upper node group U. It is checked in step S23 again whether the upper node identifier U/u is valid.

If the upper node identifier U/u obtained in step S25 is invalid, the procedure from step S24 is repeated as far as upper node groups can be selected. If a valid upper node identifier has been obtained from any upper node group, this repetitive processing is ended, and a stream distribution control procedure is executed (step S26). The upper node identifier U/u is sometimes corrected to a node identifier different from that used for the final response, as will be described later. Finally, the inquiry source is notified of the upper node identifier U/u, and the processing is ended (step S27).

In the above processing, the entity of the node group is usually a dedicated node group management server which is realized using a known means such as remote procedure call. In this case, the transport address of the management server can be used as the node group identifier. In TCP/IP, the node group identifier is represented by a set of an IP address and a port number. Generally, however, this does not apply to all cases. When distributed management is performed by a known group communication means, the group identifier of this means may be used as a node group identifier.

Some supplementary explanations will be given in association with the processing procedure shown in FIG. 2.

In step S22, an upper node N/u associated with the transmitting node T/t is present when the upper node N/u corresponds to the transmitting node T/t itself or a relay node for the transmitting node T/t, when the upper node N/u is the receiving node corresponding to the transmitting node T/t, and the upper node N/u itself has a relay function, or when a relay node for the transmitting node T/t can be newly arranged in the node group N.

Selection of an upper node group in step S24 is performed using an upper node group lookup table managed in the node group N. This lookup table defines an upper node group directly corresponding to a designated node group. In the arrangement shown in FIG. 1, the lookup table entry for the transmitting node group T in the receiving node group R includes the relay node groups X and Y. The lookup table is intentionally prepared by the manager of the node group N. The lookup table has predetermined initial setup information and also can be dynamically updated by an inter-node-group distribution management information exchange means. This distribution management information exchange means has an arrangement similar to a route information exchange means at the network level as a known means.

If an inquiry for the same transmitting node T/t has already been performed, an inquiry as to an upper node group in step S25 is not performed in response to the subsequent requests. If no valid identifier has been obtained in previous inquiries, further inquiries are unlikely to succeed for a while. For this reason, subsequent inquiries for the transmitting node T/t may be stopped for a predetermined period.

Figure 3:
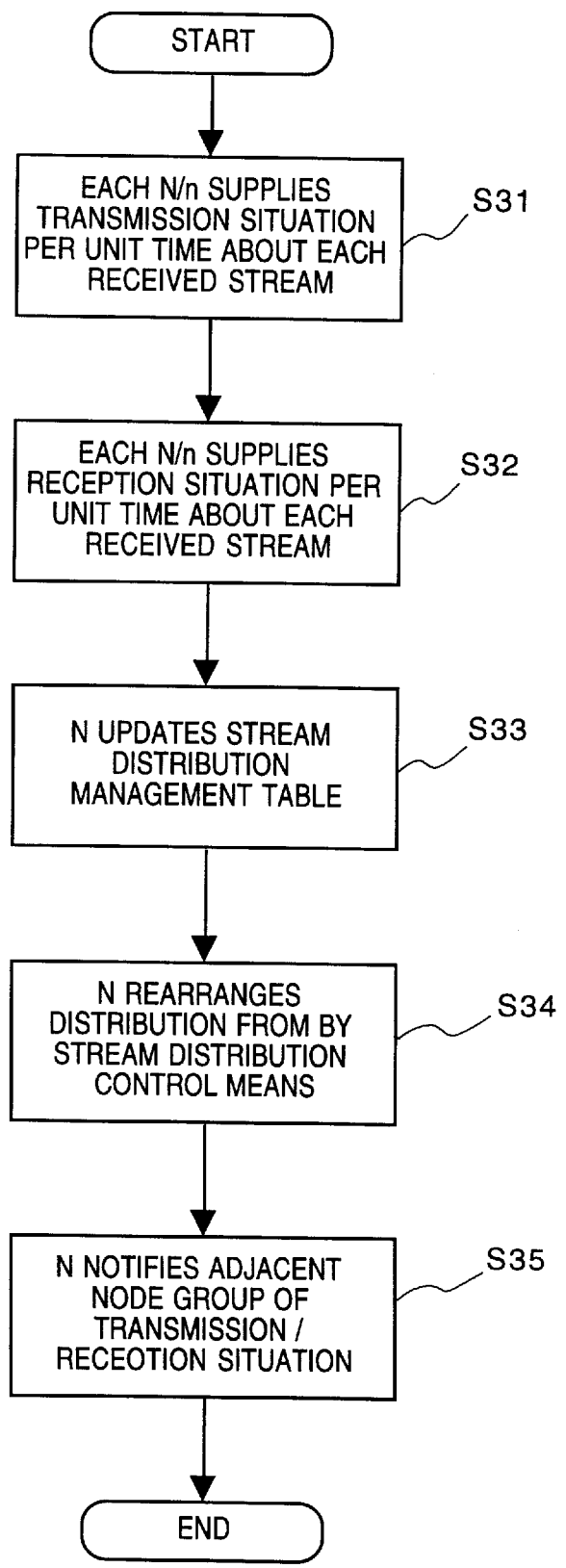
FIG. 3 is a flow chart showing the processing procedure of a stream distribution route updating means.

FIG. 3 is a flow chart showing the processing procedure of the stream distribution route updating means. This processing procedure is performed to allow the node group to grasp the stream data transmission/reception situation of each node, and used to perform processing of determining an upper node in a node group in step S22 shown in FIG. 2, or acquire distribution management information which is looked up by the stream distribution control means (to be described later).

First, of the series of nodes N/n belonging to the node group N, transmitting or relay nodes supply the transmission situation per unit time of an associated stream to be sent (step S31), and receiving or relay nodes supply the reception situation per unit time of an associated stream to be received (step S32). The transmission/reception situation per unit time, which is to be supplied in steps S31 and S32, are node operation information including the data amount, the number of packets, the number of errors, the CPU load value, and the I/O load value. Even if there are no associated streams, null situation is supplied. The node group updates the stream distribution management table using the supplied transmission/reception situation (step S33). Especially when given stream distribution has been stopped, and it is determined that the corresponding stream distribution route has become unnecessary, this entry is deleted from the stream distribution management table.

Next, the stream distribution control means is applied to rearrange the distribution form in the node group, as needed (step S34). Finally, adjacent node groups, i.e., upper node groups registered in the node group lookup table and lower node groups of streams registered in the distribution management table are notified of the transmission/reception situation of the whole node group, and the processing is ended (step S35).

Processing in steps S34 and S35 in this processing procedure need not always be executed immediately after processing in step S33. In fact, these processing operations may have adverse effects except a case wherein the distribution situation largely changes. In addition, processing in step S35 may be ignored in the adjacent node groups. More specifically, it is more effective to delay processing in step S34 at a predetermined time interval, and not to execute processing in step S35 except when situation has a predetermined change.

Figure 4:
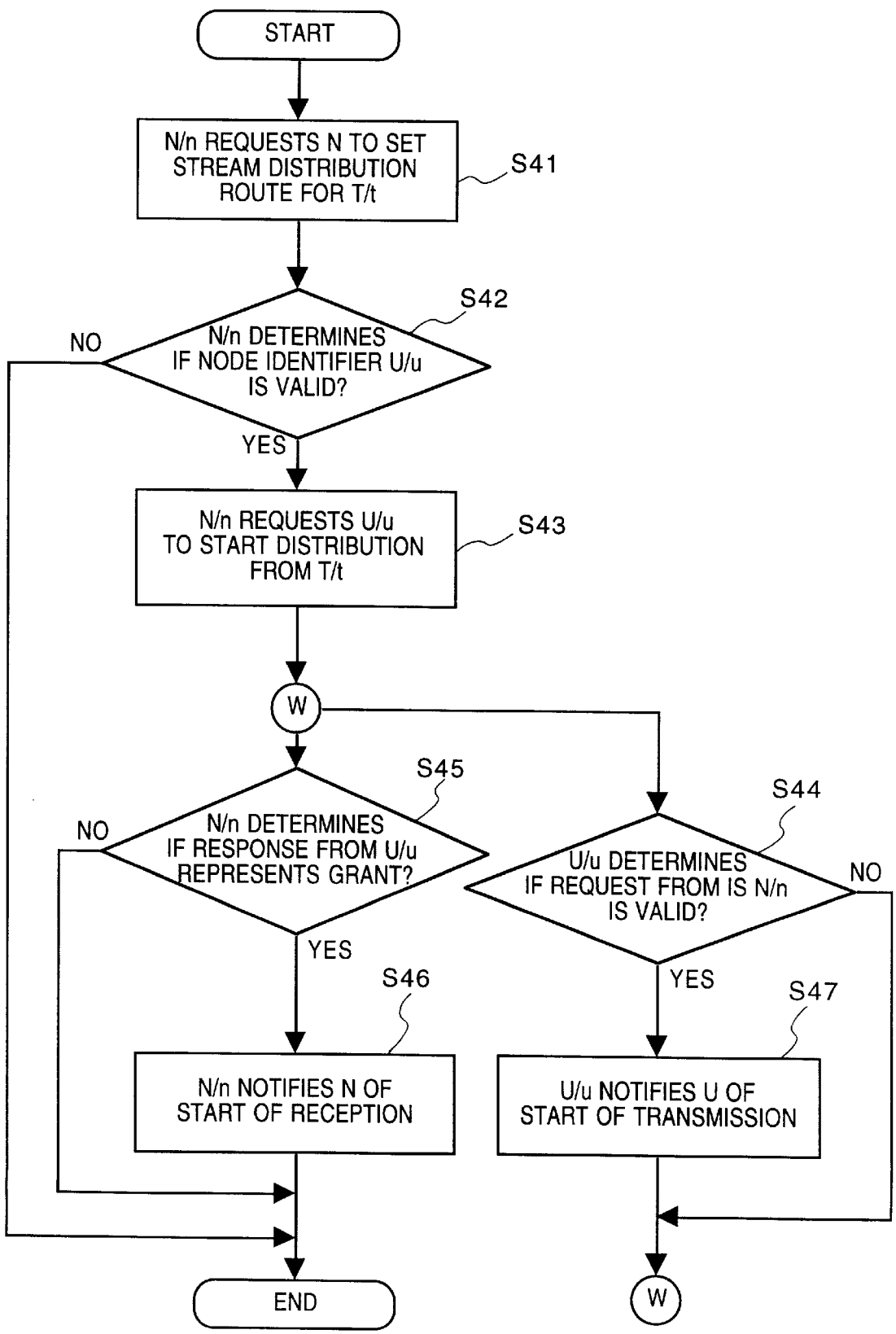
FIG. 4 is a flow chart showing the processing procedure of a stream distribution start means.

FIG. 4 is a flow chart showing the processing procedure of the stream distribution start means.

The node N/n requests stream distribution route setting for the transmitting node T/t (step S41). This request is processed in the node group N following the procedure shown in FIG. 2. Consequently, the node N/n acquires an upper node U/u. However, if the upper node identifier U/u is invalid, it is determined that distribution route setting is disabled, and the processing is ended (step S42). Conversely, if the upper node identifier U/u is valid, the following processing is performed.

The node N/n requests the upper node U/u to start distribution and waits for a response to the request (step S43). The upper node U/u verifies the validity of the distribution start request from the node N/n. If the request is valid, the request is granted. If the request is invalid, the request is denied (step S44). The wait state of the node N/n is canceled upon receiving the response from the upper node U/u, and it is determined that the request has been granted (step S45). If YES in step S45, the node group N is notified of the start of reception (step S46).

When the upper node U/u has granted the request, transmission is started, so the node U is notified of the start of transmission (step S47). When all the above processing operations are ended, the processing is ended. Notification of the start in steps S46 and S47 is processed in each node group following the procedure shown in FIG. 3.

The validity verification processing in step S44 is performed by the upper node U/u after the distribution route is established, so the request is bound to be granted. However, this does not apply to a case wherein access from the receiving node is controlled by the transmitting node T/t. When access from the receiving node R/r which has issued the first distribution start request is denied, the upper node U/u finally determines that the request is invalid. In such a case, validity verification is performed not in an intermediate relay node but in the uppermost transmitting node, and additional information necessary for validity verification, e.g., a user identifier is appropriately transferred.

Figure 5:
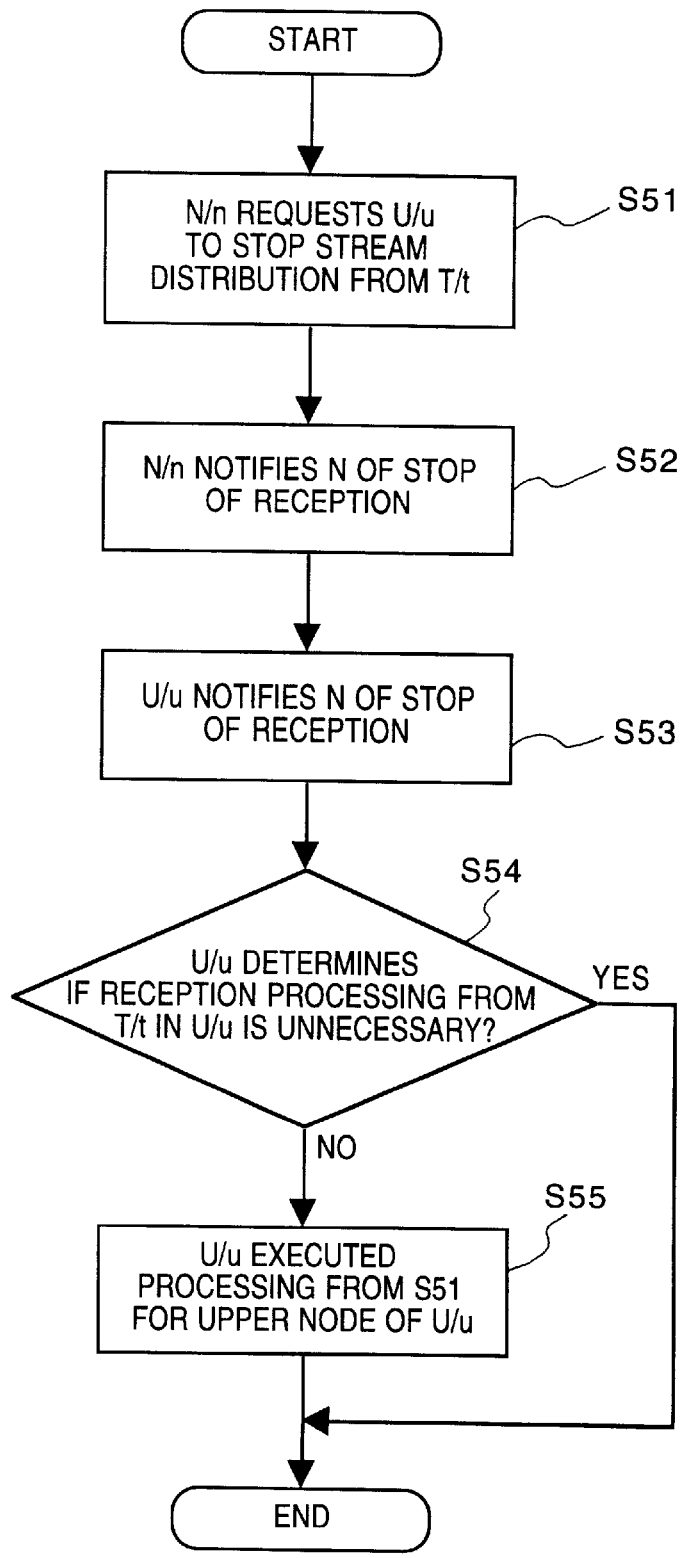
FIG. 5 is a flow chart showing the processing procedure of a stream distribution stop means.

FIG. 5 is a flow chart showing the processing procedure of the stream distribution stop means.

This processing procedure is started when the node N/n which has executed the stream distribution start means shown in FIG. 4 requests the upper node U/u to stop transmission (step S51). Next, the node group N is notified of the stop of reception from the node N/n, and the processing is ended (step S52). Upon receiving the distribution stop request, the upper node group U supplies the stop of transmission associated with the node N/n (step S53). If the upper node U/u is a relay node, it is determined whether stream reception processing by the upper node U/u itself is to continue (step S54). The necessary condition for determining that stream reception processing by the upper node U/u is unnecessary is that the upper node U/u is not performing stream relay processing for a node other than the node N/n. If NO in step S54, the procedure from step S51 is executed for the upper node of the upper node U/u, and the processing is ended (step S55).

Figure 6:
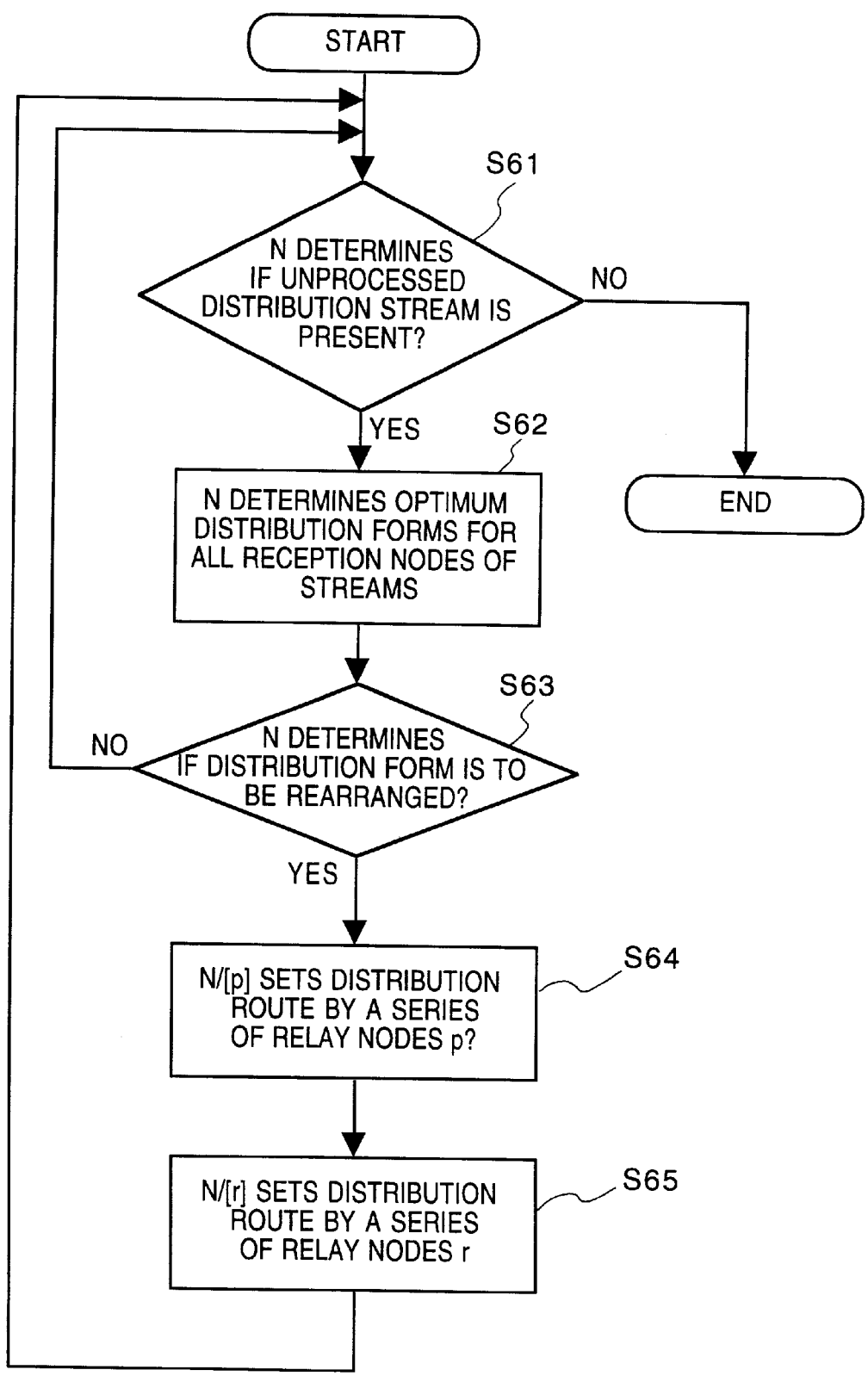
FIG. 6 is a flow chart showing the processing procedure of a stream distribution control means.

FIG. 6 is a flow chart showing the processing procedure of the stream distribution control means.

This processing procedure is started by the inter-node-group control means, and more specifically, in step S26 shown in FIG. 2 and in step S34 shown in FIG. 3. This processing is performed to rearrange the distribution form in the node group.

The node group N performs the following processing or all streams included in the node group (step S61). All receiving nodes associated with each stream are obtained, and an optimum distribution form is determined (step S62). The optimum distribution form is determined on the basis of the network arrangement in the given node group, and for this purpose, unicast distribution is changed to multicast distribution, multicast distribution is changed to unicast distribution, or a new relay node is set.

The distribution form is determined for the purpose of reducing the load on the network, although the distribution form need not always minimize the load on the network and may be a semioptimum distribution form according to learning by observation.

When rearrangement of the distribution form is confirmed in step S62, the following processing is performed (step S63). If distribution route setting or resetting is necessary for each of all relay node groups N/[p] including the newly arranged relay nodes, the stream distribution route setting means is applied (step S64). Finally, if distribution route resetting is necessary for each of the series of receiving node groups N/[r], the stream distribution route setting means is applied, as in step S64 (step S65). When the above processing operations are applied to all streams, the processing is ended. The stream distribution route setting means used in steps S64 and S65 basically performs the procedure shown in FIG. 2. In this case, however, the upper node is always determined in step S22, so processing in steps S23 to S25 is never executed, and processing in step S26 is ignored because it is independently started.

As been described above, according to this embodiment, in distributing real-time data such as image or audio data using a network, the means for forming node groups of various nodes for transmitting/receiving data, the inter-node-group distribution route selection means, and the intra-node-group distribution route selection means are provided. With this arrangement, the distribution route localization due to route selection at the network level can be avoided. Because the same stream is shared by nodes, traffic can be reduced macroscopically. In addition, traffic can be reduced by selectively using the multicast function. Therefore, real-time stream data can be efficiently distributed while maintaining a high quality.

Note that the network to which the present invention is applied may be either a wide area network or a small-scale network.

As described above, according to the first embodiment, node devices associated with each data distribution form a node group, and the distribution route among the node groups, and the distribution route in each node group are appropriately selected. With this arrangement, an appropriate real-time distribution route can be dynamically determined.

<Second Embodiment>

The second embodiment to be described below is a development of the first embodiment and provides a real-time data distribution control system and method which enable autonomous control of macroscopic reduction traffic by sharing the same stream by nodes while avoiding distribution route localization due to route selection at the network level and also enable efficient distribution of real-time stream data having a high quality, and a storage medium therefor.

This embodiment basically has the same arrangement as in FIG. 1 except software for controlling the operation of each node.

According to this embodiment, in the arrangement shown in FIG. 1, nodes constituting a node group are managed by a node group management server which operates on an appropriate node device in the node group. The node group management server is identified with a node group identifier and provides a node group forming means for dynamically managing the formation of various nodes into a node group. The node group management server and the node group are regarded as identical except a confusing case.

Figure 7:
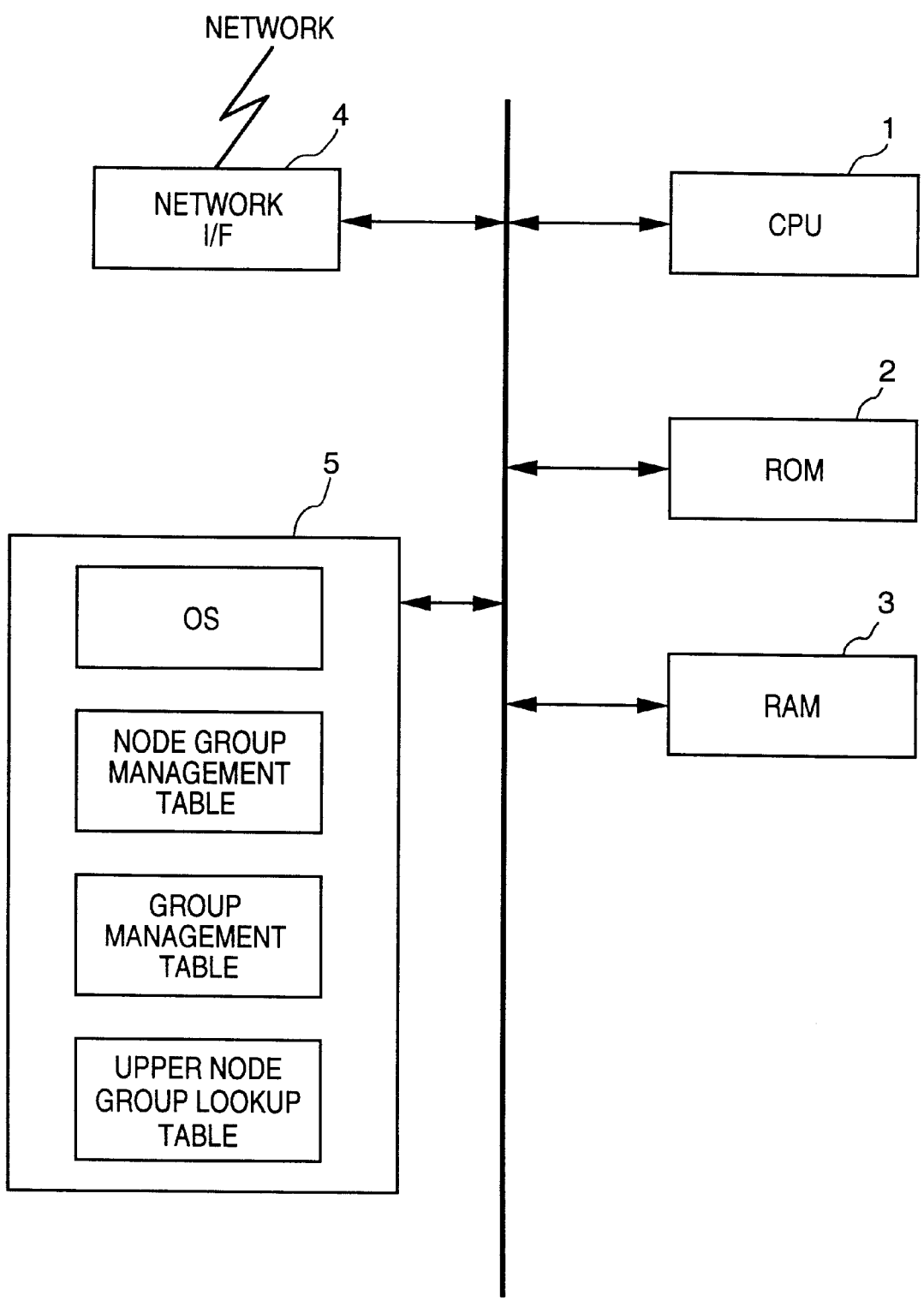
FIG. 7 is a block diagram of a node group management server in the second embodiment.

FIG. 7 is a block diagram showing a detailed arrangement of the above-mentioned node group management server. The remaining nodes have the same hardware arrangement as in FIG. 7 and the same structure as that of a general personal computer or workstation. Reference numeral 1 denotes a CPU for controlling the entire apparatus; 2, a ROM storing a boot program, a BIOS, and the like; 3, a RAM as a main memory; 4, a network interface for performing information communication with other nodes on the network; and 5, a hard disk storing an OS, a node group management program (to be described later), and the addresses of nodes constituting the node group (since this embodiment exemplifies the TCP/IP protocol, as will be described later, the IP address and mask information are also included). This system also has an upper node group lookup table which is used to select a node to function as a node for relaying information from an upper group. The programs including the OS and the table are loaded in the RAM 3 when they are to be executed by the apparatus, and are executed by the CPU 1.

In this embodiment, the TCP/IP will be exemplified as a network communication protocol. The node group or node corresponds to the host in the TCP/IP and has a unique IP address. In addition, the node group or node is made to correspond to the host name and address by a known name solving means. The present invention may be practiced using a protocol generally having a node identification means and a naming means in place of the TCP/IP. In this case, rules associated with the IP address or host name are corrected in accordance with the definition of the protocol, although a series of means to be described below can be applied with minor modifications.

Figure 8:
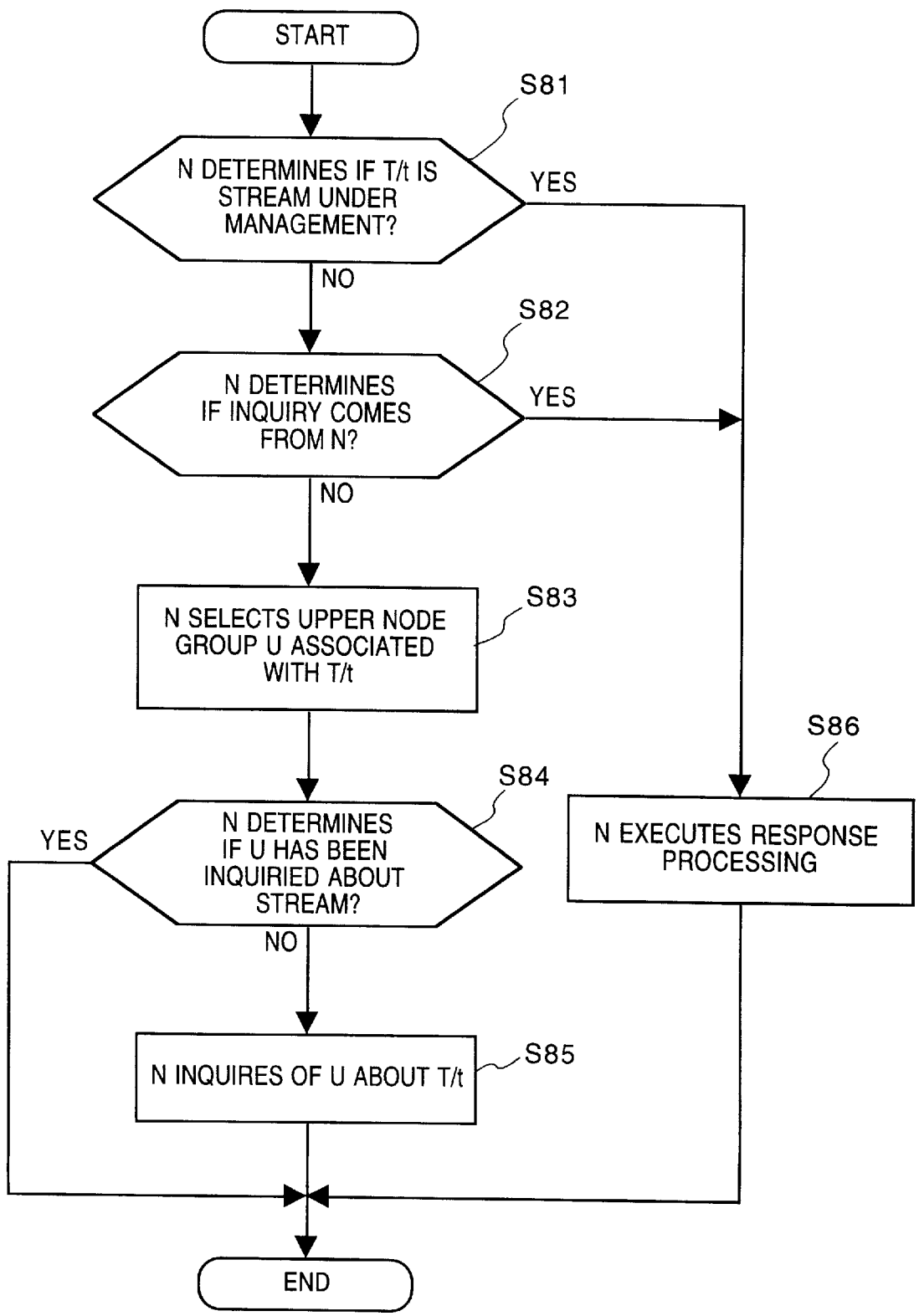
FIG. 8 is a flow chart showing an inquiry request processing procedure in stream distribution route setting.

FIG. 8 is a flow chart showing an inquiry request processing procedure in stream distribution route setting in this embodiment. This processing procedure is used to form a new distribution route in association with an unknown stream transmitted from a node T/t, and executed by a node group management server N.

It is determined in step S81 whether the designated stream is under management of the node group N. If YES in step S81, response processing is performed in step S86, and the processing is ended. A stream under the management of the node group N means that the transmitting node T/t belongs to the node group N. It is determined in step S82 whether an inquiry request has been generated from the node group N. As will be described later, the node group generates the inquiry request in various processes. Determination processing in step S82 is performed to prevent cycle generation of node groups. This determination processing can be easily realized by adding the request generation source node identifier N to the inquiry request message. If NO in steps S81 and S82, the following processing is performed. In step S83, an upper node group U to which the inquiry request is issued is selected. If it is determined in step S84 that an inquiry about the same stream has not been issued, an inquiry request is issued in step S85, and the processing is ended. The inquiry request in step S85 is processed in the node group U following the procedure shown in FIG. 8.

In processing in step S86, three kinds of response are made in accordance with the situation of the stream. In the first case, the designated stream can be distributed. Various attributes of the stream, including the compression scheme, and the list of transmitting or relay nodes included in the node group are returned as a response. In the second case, the designated stream cannot be distributed. Additional information representing the reason why it is determined that distribution cannot be performed is returned as a response. In the third case, the node group cycle is detected. Additional information representing detection of a cycle is returned as a response. In step S84 or S85, the processing is ended while response processing is deferred. In this case, when an upper node group is to be selected in step S83, the inquiry is recorded in an inquiry queue belonging to the corresponding node group. Response processing for the inquiry recorded in the queue is performed following the same procedure as in the above-described processing in step S86 on the basis of the response obtained by response processing in the upper node group. Especially, in the network environment, there is no guarantee that a response can be obtained in a predetermined time. For this reason, if no response is obtained after the elapse of a predetermined time, it is regarded that the designated stream cannot be distributed, and response processing is performed.

Figure 9:
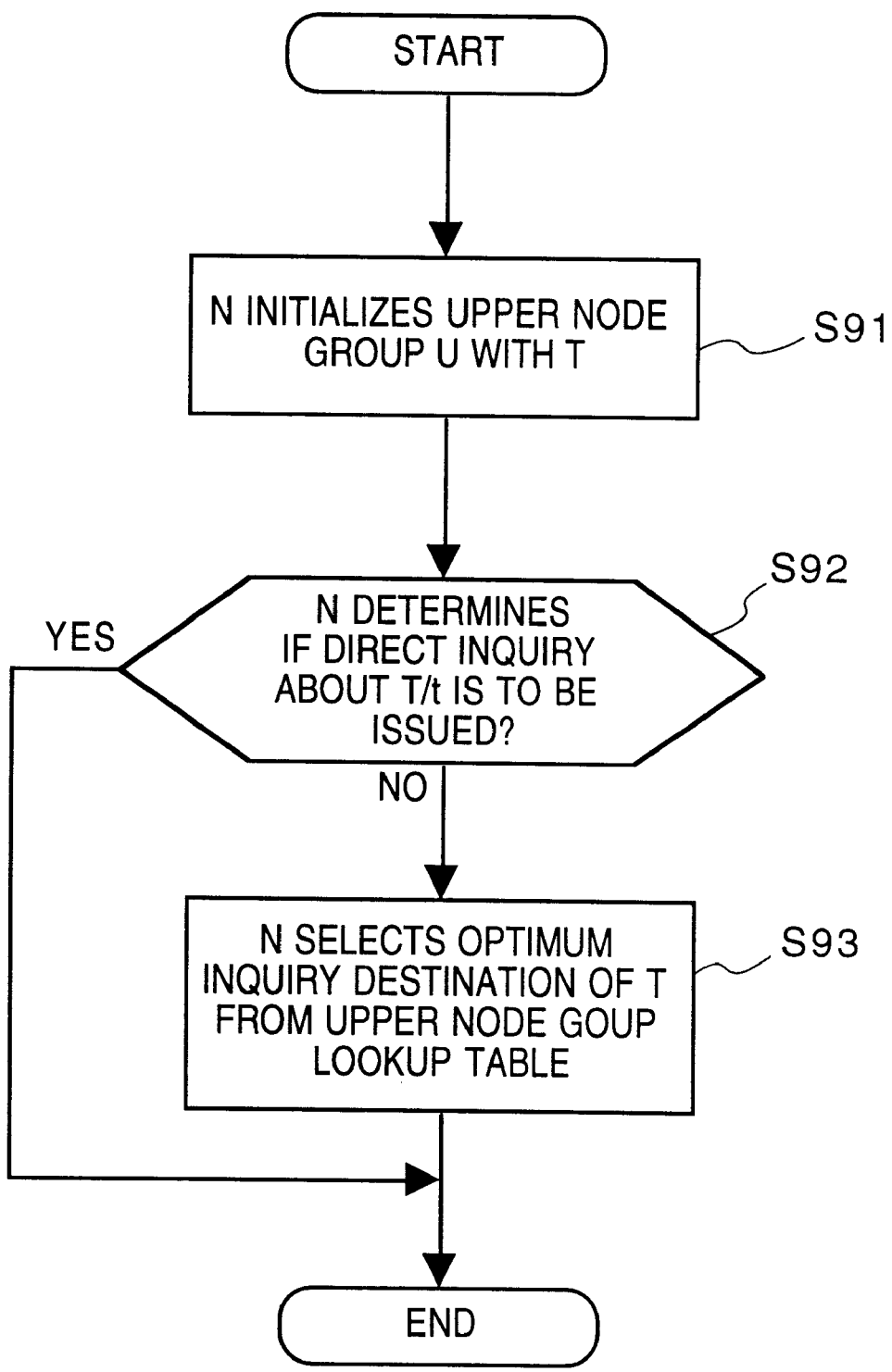
FIG. 9 is a flow chart showing an inquiry destination upper node group selection processing procedure.

FIG. 9 is a flow chart showing an inquiry destination upper node group selection processing procedure in step S83 shown in FIG. 8. In step S91, an upper node group U is initialized to a node group T. In step S92, it is determined whether an inquiry associated with the stream T/t is to be directly sent to the node group T. If YES in step S92, the processing is immediately ended. If NO in step S92, an upper node U most suitable for the node group T is selected from the upper node group lookup table.

FIG. 10 is a table showing the structure of the node group lookup table used in the processing procedure shown in FIG. 9. The node group lookup table is formed as a list having sets of node patterns and upper node groups. The node pattern is used for matching with a node group to which the designated stream belongs. The node pattern is a character string pattern used for matching with a host name or an address pattern used for matching with an address. The character string pattern includes two specific characters, i.e., "*" matches an arbitrary character string and "?" matches an arbitrary character. The address pattern is an IP address with a mask. If the node group T to which the stream T/t belongs is "x.y.co.jp", "10.10.1.1" is selected from the node group lookup table as an upper mode group whose first item matches. In a similar manner, if the node group T is "10.2.2.2", "ng.foo.co.jp" is selected on the basis of the second item. If a plurality of items, e.g., the first and second items match, the second item having a higher degree of matching is selected. The pattern "*" is considered to match an arbitrary address pattern. The degree of matching in this case is lower than that of all the remaining address patterns.

The node group lookup table is initialized in accordance with null contents or contents which are given in generation of the node group. The node group lookup table may also be dynamically updated on the basis of changes in node group arrangement due to addition or deletion of nodes, negotiation among nodes, or management by the node group manager. In dynamically updating the node group lookup table, the node groups are appropriately selected on the basis of identification and authority of the updating source.

Processing in step S92 shown in FIG. 9 is the same as that performed using the node group lookup table. In this case, however, the inquiry destination upper node group is unnecessary, so a lookup table including only node patterns is used. In addition, when the pattern matches any pattern in the lookup table, it is determined that the node is to directly inquire of the node group. This determination processing is performed before looking up the upper node group lookup table in step S93. The reason for this is as follows. The upper node group lookup table dynamically changes in accordance with the node group arrangement, although the node group to which the inquiry is to be directly generated is often specified in advance. When determination processing in step S92 is separated from step S93, the processing can be more easily realized. Processing operations in steps S92 and S93 may be integrated to determine whether an inquiry associated with the given stream is to be directly or indirectly generated, as a matter of course.

<Third Embodiment>

In the above-described embodiment (second embodiment), since the inquiry response result in stream distribution route setting is not stored, inquiry processing for the same stream is repeated. Generally, however, the stream holds its state for a long time, so this processing form is not efficient. In addition, since the user is immediately informed of an inquiry for an invalid stream as an abnormality, and the frequency of such notification is high, the efficiency further lowers. To solve these problems, a means for holding the result of stream inquiry response is arranged.

Figure 11:
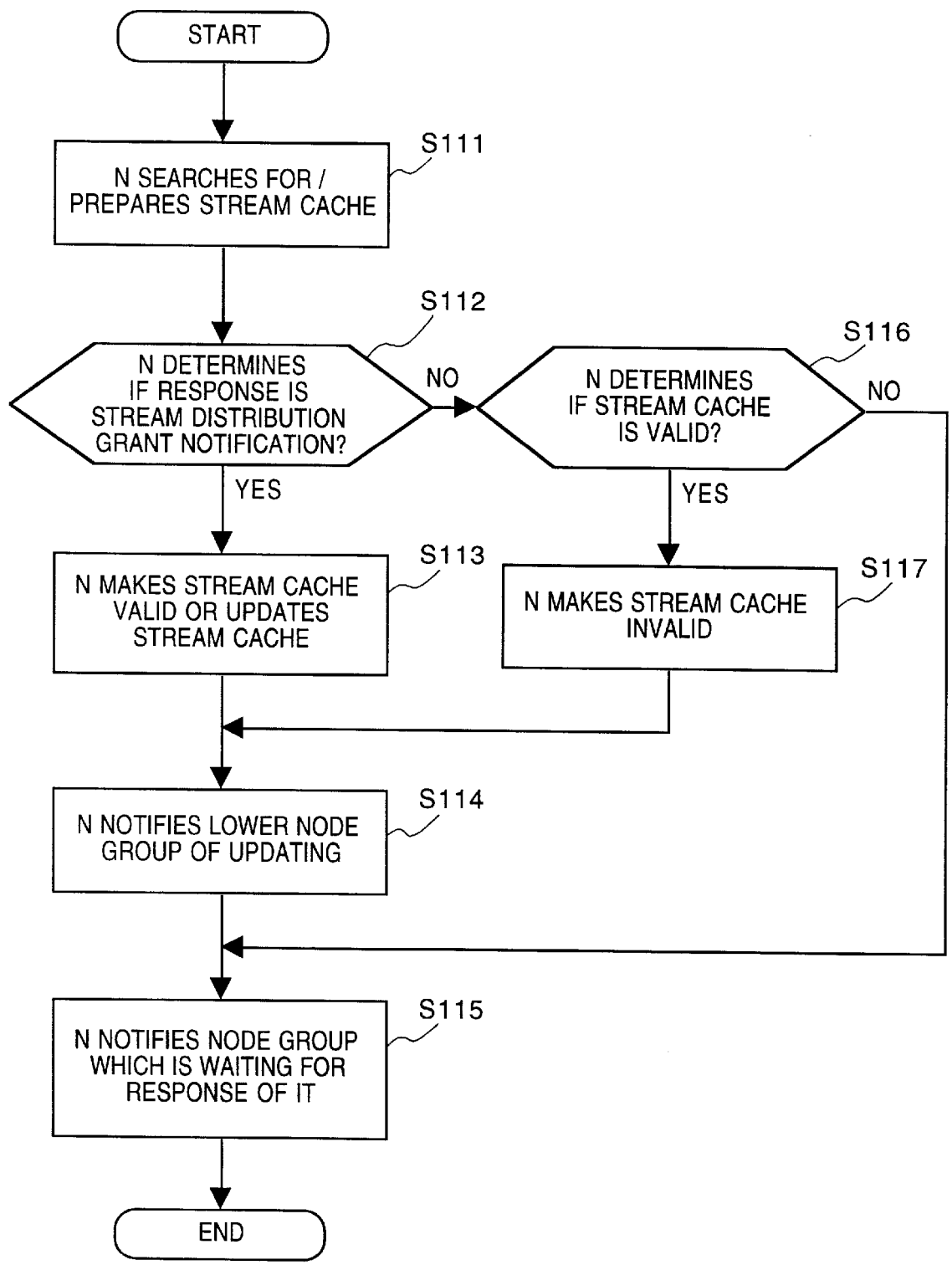
FIG. 11 is a flow chart showing an inquiry response processing procedure in stream distribution route setting.

FIG. 11 is a flow chart showing an inquiry response processing procedure in stream distribution route setting. In this processing procedure, in addition to response notification processing corresponding to an inquiry request, updating notification processing based on a change in state of a stream is performed. A stream cache is arranged as a means for holding inquiry response contents, and the following processing is performed on the basis of notification from an upper node group and the state of the stream cache.

In step S111, the stream cache is searched for. If there is no stream cache, a null cache entry is prepared. It is determined in step S112 whether notification from the upper node group represents that the stream can be distributed. If YES in step S112, the stream cache is validated or updated in step S113. In step S114, a series of lower node groups which have already held stream caches are notified of updating. In step S115, a response is returned to a series of lower node groups which are waiting for a response, and the processing is ended. The lower node groups notified of a response in step S115 are recorded in the stream cache entry, and when processing from step S111 is performed again, the stream cache entry is looked up as lower node groups in step S114.

If NO in step S112, it is determined in step S116 whether the stream cache is valid. If YES In step S116, the stream cache is invalidated in step S117, and processing from step S114 is performed. In this case, in updating notification in step S114, all lower node groups recorded in the stream cache are deleted, and the lower node groups which are notified of a response are not recorded in step S115. If NO in step S116, no lower node groups to be notified of updating are present. For this reason, response processing for the node groups which are waiting for a response is performed in step S115, and the processing is ended.

According to the inquiry response processing procedure in stream distribution route setting, the inquiry request processing procedure in stream distribution route setting shown in FIG. 8 can be efficiently executed. More specifically, the stream cache may be checked immediately before step S84, and if a corresponding entry is present, response processing in step S86 may be immediately performed.

For stream cache validation processing in step S113, wasteful updating notification can be omitted by setting a lifetime of cache entry and releasing entries which are not in use for a predetermined period. This process can be implemented by arranging a stream release request means for the upper node group and deleting the request issue source from the record of the lower node group that is looking up the stream cache in the upper node group which has received the stream release request.

Similarly, for stream cache invalidation processing in step S117 as well, the cache holding period is set to delete the number of times of inquiry for invalid cache entries. In case of cycle detection, the invalid stream cache entry holding period may be set to be longer because cancel of a cycle generally takes a long time. Especially, in generation of a cycle, no valid stream cache entries are held in advance, so processing from step S117 is unnecessary. Therefore, cycle detection may be recorded in step S116, and then processing in step S115 may be performed.

<Fourth Embodiment>

In the internet which has been becoming popular in recent years, a firewall is used to prevent illicit access from external systems. A means for applying the present invention to a network environment having a firewall will be described below.

Figure 12:
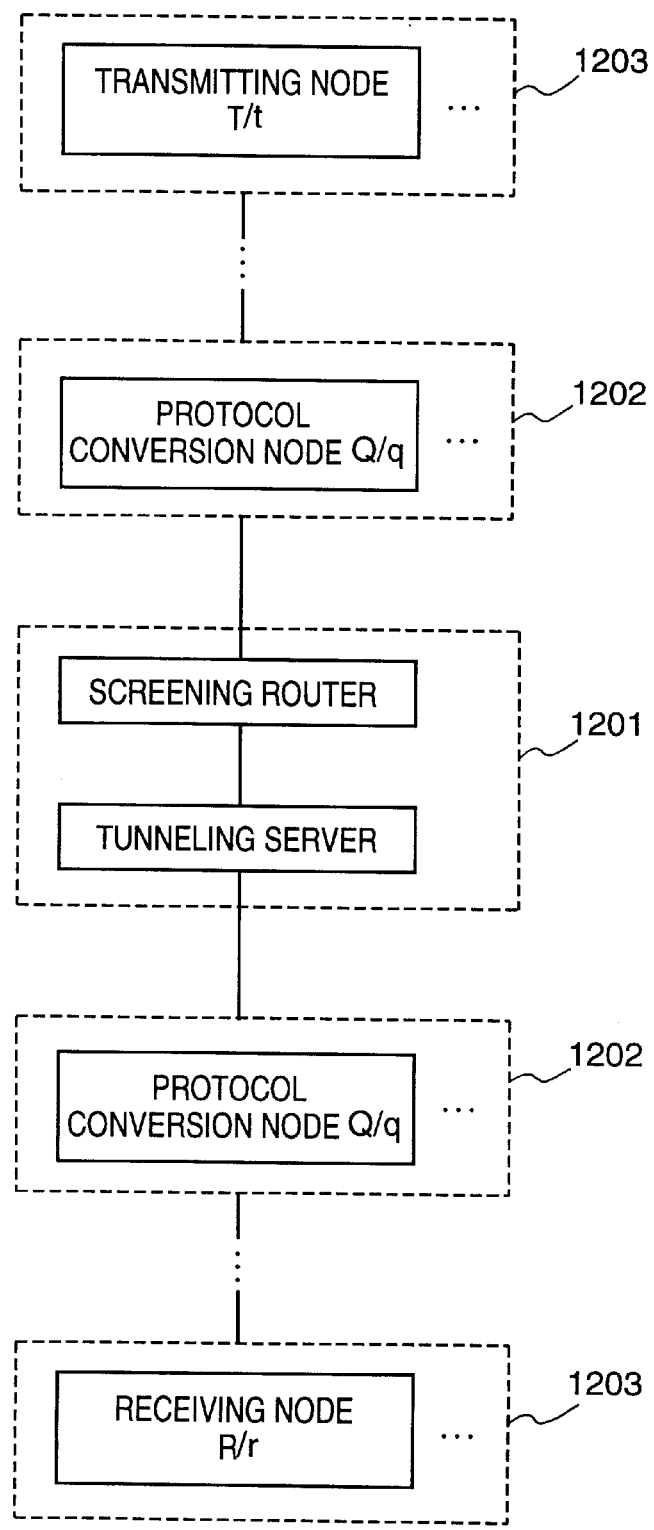
FIG. 12 is a view showing the arrangement of a network environment including a firewall.

FIG. 12 is a view showing the architecture of a network environment including a firewall. In FIG. 12, reference numeral 1201 denotes a firewall including a screening router and a tunneling server. The screening router has a function of inhibiting passage of a packet except for a specific host or port in TCP/IP. The tunneling server has a function of indirectly passing a packet using a port the passage through which is authorized by the screening server. The tunneling server provides a packet transmission/reception function including designation of a destination by a predetermined protocol.

Reference numeral 1202 denotes sets of node groups each including a protocol conversion node and opposing via the firewall. The protocol conversion node transfers a protocol which cannot directly pass through the firewall using the tunneling server.

Reference numeral 1203 denotes a transmitting node group or a receiving node group described in FIG. 1.

A stream distribution route from a receiving node R/r to a transmitting node T/t is set basically following the procedure shown in FIG. 8. However, the upper node of the protocol conversion node must be a protocol conversion node, and the upper node must be designated for the tunneling server.

FIG. 13 shows the structure of a node group lookup table including firewall passage correspondence. This node group lookup table is formed by extending the lookup table shown in FIG. 10 and adding the tunneling server. In this lookup table, both the upper node group and the tunneling server need not be designated, and one of them may be omitted. When the tunneling server is omitted, an inquiry to the upper node group is generated without intervention of the firewall. When the upper node group is omitted, an inquiry is directly sent to the node group T, to which the stream T/t belongs, through the firewall using the tunneling server.

The inquiry processing in step S85 shown in FIG. 8 are the same as in the above description except designation of a destination, which is performed for the tunneling server when an inquiry is sent to the upper node group through the firewall. For inquiry response processing as well, the node list included in the distribution enabling response may be checked, and the procedure may be corrected such that when a protocol conversion node corresponding to that in the firewall is not present, distribution is disabled. In the embodiment using the stream cache shown in FIG. 11, if a usable protocol conversion node is not present on the upper node group side, a distribution disabling response may be returned while explicitly indicating that the inquiry is sent through the firewall. According to this arrangement, unnecessary lower node groups need not be recorded, and the number of times of cache updating or release processing can be reduced, so more suitable operation is enabled.

In this embodiment, the tunneling server in the firewall can be defined in units of node patterns. Even when there are a plurality of firewalls or tunneling servers, a route optimum for stream distribution can be selected. Passage through the firewall is determined on the basis of independent determination by each node group. For this reason, even when a plurality of firewalls are present between the receiving node group and the transmitting node group, application can be made without any problem.

<Fifth Embodiment>

In the above embodiments, the stream distribution route is gradually set bottom up, i.e., from the receiving node side. The distribution route setting procedure is based on the assumption that the upper node group lookup table in each table is appropriately formed. However, in a network environment having a complex route formation, and more particularly, in the backbone of the Internet, it is difficult to form an appropriate node group lookup table for an arbitrary stream. Consequently, the stream cannot pass through a desired relay node group or conversely passes through an undesired relay node group, so traffic overlaps or folds back.

Figure 14A:
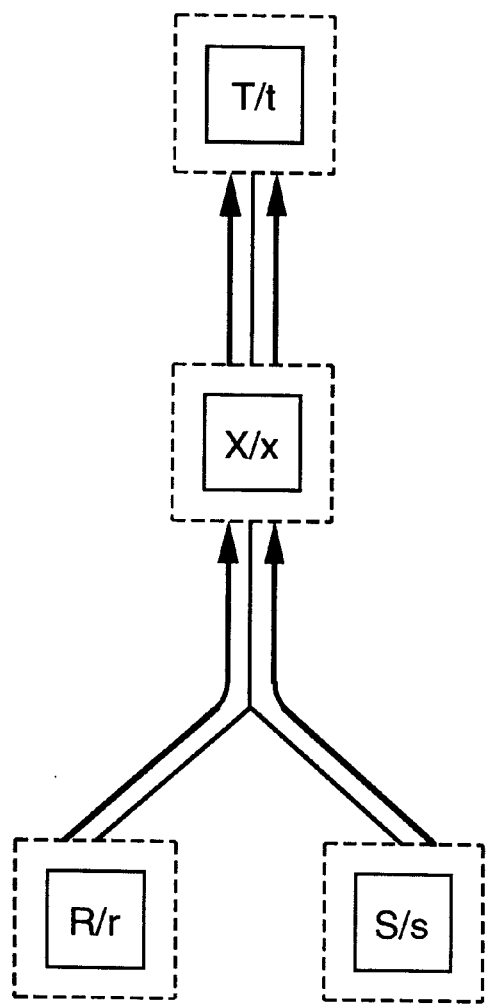
FIGS. 14A and 14B are views showing problems generated by an inappropriate upper node group lookup table.
Figure 14B:
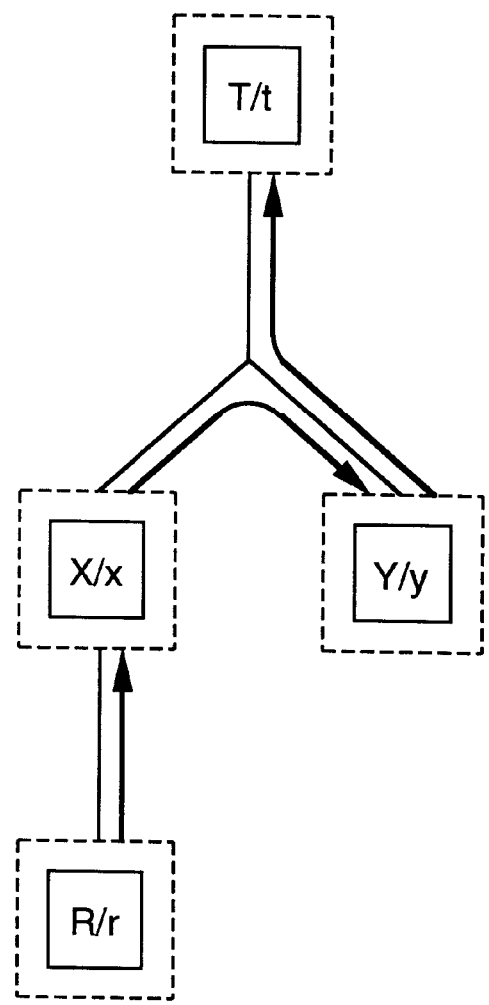
Figure 15:
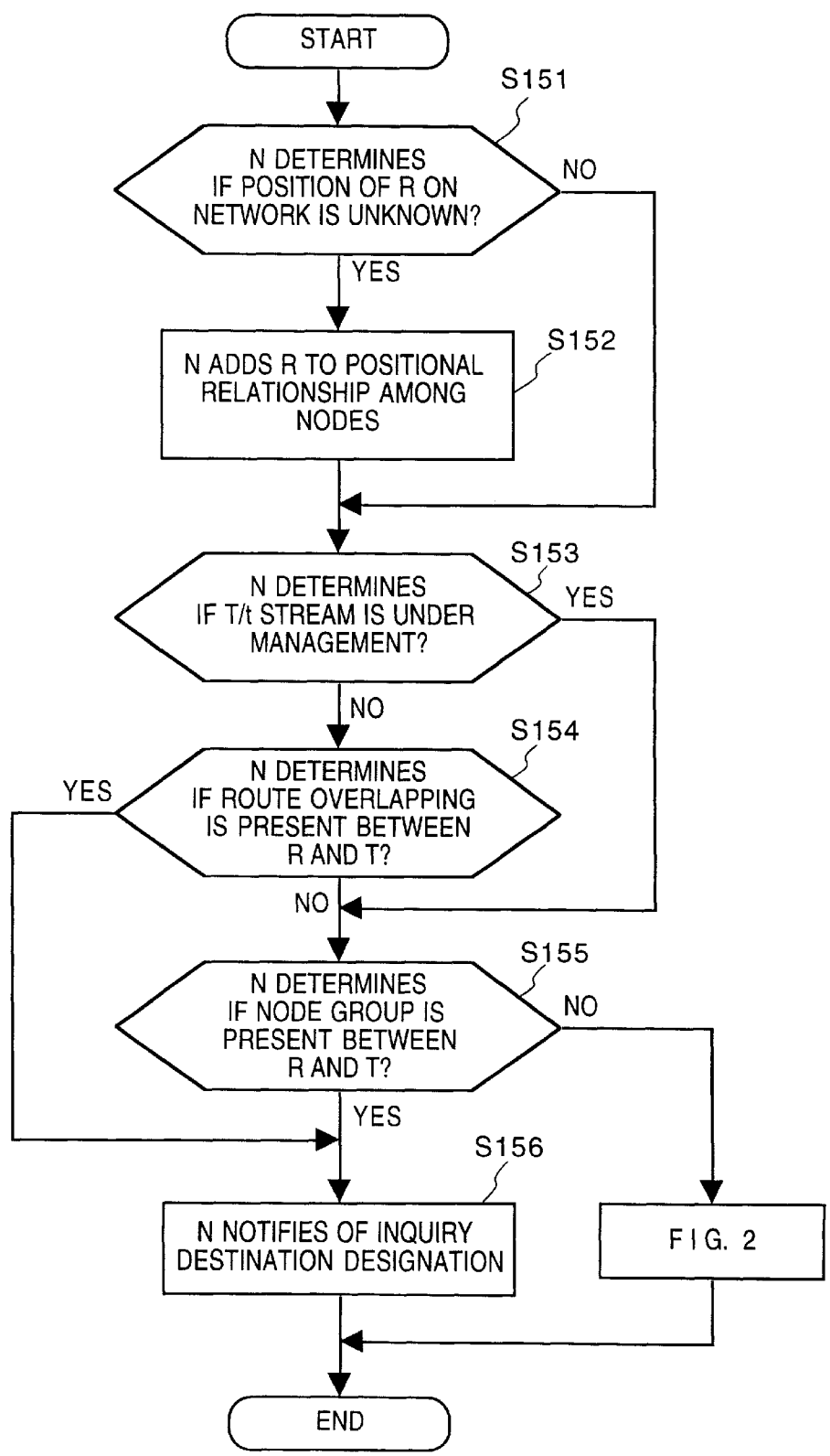
FIG. 15 is a flow chart showing an inquiry request processing procedure in stream distribution route setting based on the positional relationship among node groups.

In FIG. 14A, a distribution route passing through an appropriate upper node group X/x is used for a receiving node R/r. However, for a receiving node S/s, a stream is directly distributed from a transmitting node T/t without passing through the upper node group X/x, so traffic on the network between the nodes T/t and X/x is doubled. In FIG. 14B, the node X/x is appropriate as the upper node group of the receiving node R/r, although a node Y/y is inappropriate as the upper node group of the node X/x. As a result, traffic folds back on the network around the node Y/y.

To solve this problem, the following means is arranged: an inter-node-group positional relationship establishment means and a response means for designating an inquiry destination in response to a stream distribution route setting request on the basis of an established positional relationship.

The inter-node-group positional relationship establishment means holds, for a series of node group viewed from a given node group, the relationship between the lower and upper nodes based on the positional relationship on the network as a tree structure. In FIG. 14A, when viewed from the node group T, the node group X is on the upper side of the node groups R and S, and the node groups R and S are at the same level. In FIG. 14B, when viewed from the node group T, the node groups X and Y are at the same level, and the node group R is on the lower side of the node group X. Such positional relationship in the network can be directly determined from route information or using a known means such as a recording route means or route discovering means. The positional relationship need not be established among all node groups and may be set for main node groups on the backbone. In this case, those node groups may be notified of generation or deletion of node groups to individually maintain the tree structure.

FIG. s15 is a flow chart showing an inquiry request processing procedure for a stream distribution route setting request based on the established positional relationship.

It is checked in step S151 whether the positional relationship of the request source node group R on the network is unknown. If YES in step S151, the position is reflected to the tree structure which holds the inter-node-group positional relationship in step S152. It is checked in step S153 whether the designated stream T/t is under the management of the node group N. If NO in step S153, it is checked in step S154 whether the route to the transmitting node group T overlaps that to the request source node group R. Overlap of routes means that traffic overlaps or folds back in the network except near the node group N. If YES in step S154, the transmitting node group T is designated as an inquiry destination node group in step S156, and the processing is ended.

The neighbor of the node group N means a range where traffic can locally overlap or fold back. Generally, this range means a wide area network to which the node group N directly connects. However, a wider range may be intentionally designated as a neighbor in consideration of wide-area traffic distribution. For example, the list of network addresses may be held in units of node groups to explicitly specify the neighbor. In this case, the neighbor can be more effectively dynamically set in consideration of the capacity of each line positioned on the route. FIGS. 16A and 16B show upper node group selection states considering the line capacity. FIGS. 16A and 16B show three node groups X/x, Y/y, and Z/z. Two node groups Y/y and Z/z are present as candidates of the upper node group of the node group X/x. The line capacity between two node groups is represented by a line width, and simultaneously, a relative neighbor is shown. When the line capacities are different although both structures have the same connection relationship, different upper node groups may be selected, as shown in FIGS. 16A and 16B. More specifically, FIG. 16A shows a case wherein the capacity around the node group Z/z is large, and traffic can overlap. FIG. 16B shows a case wherein the capacity around the node group Y/y is large, and traffic can fold back. The line capacity need not be the absolute value of the communication capacity. Only relative comparison is necessary, so, e.g., evaluation based on five ranks from 1 to 5 may be used.

If YES in step S153 or if NO in step S154, it is checked in step S155 whether another node group string is present in the route to the request source node group R. If NO in step S155, the node group N is determined as an appropriate upper node of the request source node group R, and the flow advances to processing shown in FIG. 8. If YES in step S195, the upper node group to which the request source node group R must generate an inquiry is the lowermost node group in the string. In step S196, the node group is designated as an inquiry destination, and the processing is ended. According to the above means, the problems shown in FIGS. 14A and 14B are solved, as is apparent.

Furthermore, the object of the invention can be attained by supplying, to a system or apparatus, a storage medium in which a program code of software for realizing the function of the above-described embodiment s recorded, reading out the program code stored in the storage medium by the computer (or a CPU or MPU) of the system or apparatus, and executing the program code.

In this case, the program code itself which is read out from the storage medium realizes the function of the above-described embodiments, and the storage medium which stores the program code constitutes the present invention.

As the recording medium for supplying a program code, a floppy disk, a hard disk, an optical disk, a magnetooptical disk, a CD-ROM, a CD-R, a magnetic tape, a nonvolatile memory card, or a ROM can be used.

The present invention incorporates not only a case in which the computer executes the readout program code to realize the function of the above-described embodiments but also a case in which an OS (Operating System) running on the computer performs part or all actual processing to realize the function of the above-described embodiments with the processing.

The present invention also incorporates a case in which the program code read out from the storage medium is written in a memory of a feature expansion board inserted in the computer or a feature expansion unit connected to the computer, and thereafter, a CPU of the feature expansion board or feature expansion unit performs part or all the actual processing to realize the function of the above-described embodiments with the processing.

As has been described above, in processing of distributing real-time data such as image or audio data using the network, the upper node group selection means, the stream management information inter-node-group sharing means, the firewall passage means, and the top-down route selection means are arranged in addition to the means for forming node groups of various nodes for transmitting/receiving data, the inter-node-group distribution route selection means, and the intra-node-group distribution route selection means which are disclosed in Japanese Patent Application No. 8-320560. With this arrangement, reduction of wide-area traffic by sharing the same stream among nodes can be autonomously controlled while avoiding distribution route localization due to route selection at the network level, so a real-time data stream can be efficiently distributed while maintaining a high quality.

Various changes and modifications can be made within the scope and spirit of the present invention.

As has been described above, according to the embodiments, reduction of wide-area traffic by sharing the same stream among nodes can be autonomously controlled while avoiding distribution route localization due to route selection at the network level, so a real-time data stream can be efficiently distributed while maintaining a high quality.

As many apparently widely different embodiments of the present invention can be made without departing from the spirit and scope thereof, it is to be understood that the invention is not limited to the specific embodiments thereof except as defined in the appended claims.

What is claimed is:

1. A data distribution control method using a network, comprising the steps of:
   a request step of requesting data transmission to a relay node group managing apparatus which is independent from a source node and manages a group constituted by one or a plurality of relay nodes, said relay nodes being provided between the source node and a destination node;
   an intra-node-group distribution route selection step of selecting a transfer route and determining a destination relay node to receive the data from said source node, among said relay nodes in the node group managed by the relay node group managing apparatus, when the relay node group managing apparatus receives the request; and
   a transmission step of transmitting data using the selected transfer route.

2. The method according to claim 1, further comprises the steps of:
   an inter-node-group distribution route selection step of managing a plurality of relay node groups and selecting a relay ode group used as a distribution route,
   wherein said request in said request step is made to a relay node group managing apparatus in a relay node group selected in said inter-node-group distribution route selection step.

3. The method according to claim 2, wherein said inter-node-group distribution route selection step selects a relay node group by referring a table for managing said plurality of relay node groups.

4. The method according to claim 3, further comprising
   an updating step of updating said table by exchanging information related to distribution load among said plurality of relay node groups.

5. The method according to claim 3 or 4, wherein the intra-node-group distribution route selection step includes preparing a data distribution management table and updating said data distribution management table in accordance with a transmission/reception load situation per unit time, which is supplied from each node in said node group.

6. The method according to claim 1, wherein said transfer route is set from a downstream node.

7. The method according to claim 1, wherein said transfer route is set by selecting an upstream node from a downstream node.

8. The method according to claim 1, wherein said transfer route is set in accordance with a lookup table which defines an upstream node directly corresponding to a downstream node.

9. The method according to claim 8, wherein said lookup table is prepared by a node manager.

10. The method according to claim 9, wherein said lookup table is updated by exchanging distribution management information among said nodes.

11. A storage medium storing a program for data distribution control using a network, comprising:
   procedure codes of requesting data transmission to a relay node group managing apparatus which is independent from a source node and manages a group constituted by one or a plurality of relay nodes, said relay nodes being provided between the source node and a destination node;
   procedure codes of selecting a transfer route and determining a destination relay node to receive the data from said source node, among said relay nodes in the node group managed by the relay node group managing apparatus, when the relay node group managing apparatus receives the request; and
   procedure codes of transmitting data using the selected transfer route.

12. A data distribution control system for distributing data using a network, comprising:
   node group managing means for grouping nodes having data transmitting means, data receiving means and relay means, and for setting a transfer route and determining a destination relay node to receive data from a source node among nodes in the managed group;
   selection means for selecting a transfer route among node groups, said transfer route being determined by selecting an upper node group with regard to a source node as a destination to be requested data transmission, wherein a node group managing means in a selected upper node group determines a transfer route among the node group managed by said node group managing means.

13. The system according to claim 12, wherein said node group managing means and said selection means are arranged in a specific management server in one node group.

14. The system according to claim 12, further comprising:
   means for asynchronously issuing a data distribution route setting request to the selected upper node group;
   means for, in a request destination node group, returning any one of a distribution grant response, a distribution denial response, and an inter-node-group inquiry cycle detection response;
   means for, in a request source node group, holding information obtained for the distribution grant response for a period; and
   means for inhibiting inquiry to an upper node for a period in response to the distribution denial response or cycle detection response.

15. The system according to claim 12, further comprising:
   hold means for holding, as a list, items each comprising a set of a pattern for evaluating a degree of matching to a node group identifier and an upper node group identifier selected when the patterns match, and
   determining, for an identifier of a node group to which a designated transmitting node device belongs, an item including a pattern having the highest degree of matching in said list, and acquiring an upper node group from the determined item to select said upper node group in units of data.

16. The system according to claim 15, wherein one of a character string pattern in case wherein an identifier is given as a host name and an address pattern in case wherein the identifier is given as an address is used as said pattern for evaluating the degree of matching to said node group identifier.

17. The system according to claim 15, further comprising
   means for selecting said upper node group and acquiring firewall passage control information, and
   means for, when the control information has been acquired, sending an inquiry to said upper node group through a firewall on the basis of the control information.

18. The system according to claim 15, further comprising means for establishing a relative positional relationship among said node groups on said network, means for detecting overlap or folding back of a route on said network on the basis of the relative positional relationship, and means for supplying a node group to be set as a new inquiry destination in distribution route setting request processing, and wherein overlap or folding back of said route is removed.

19. A distribution control method of distributing image or audio data using a network, comprising the steps of:

a node group managing step of grouping nodes having data transmitting means, data receiving means and relay means, and of setting a transfer route and determining a destination relay node to receive data from a source node in nodes in the managed group;

a selection step of selecting a transfer route among node groups, said transfer route being determined by selecting a node group managing apparatus in an upper node group with regard to a source node as a destination to be requested data transmission, wherein a node group managing means in a selected upper node group determines a transfer route among nodes in the upper node group managed by said node group managing means.

20. A storage medium storing a program which is loaded and executed by a computer to cause a data distribution control apparatus for distributing data using a network function, comprising:

a program code functioning as the step of grouping nodes having data transmitting means, data receiving means and relay means, and of setting a transfer route and determining a destination relay node to receive data from a source node in nodes in the managed group;

a program code functioning as the step of selecting a transfer route among node groups, said transfer route being determined by selecting a node group managing means in an upper node group with regard to a source node as a destination to be requested data transmission, wherein said node group managing means in a selected upper node group determines a transfer route among nodes in said upper node group managed by said node group managing means.

21. The method according to claim 19, further comprising a generating step of generating node group information related to nodes in a group, each of the nodes having data transmission means, data receiving means and relay means, wherein, in said selection step, an upper node group is selected on the basis of information related to a source node for distributing data and said node group information generated in said generating step.

22. A control method for a distribution control apparatus of distributing image or audio data using a network, comprising the steps of:

a receiving step of receiving, from one of a plurality of node groups each including one or a plurality of nodes each having data transmitting means, data receiving means and relay means, a notification indicating that the distribution control apparatus is selected as an upper node group on the basis of information managed by each source node; and an intra-node-group distribution route setting step of setting a transfer route among nodes in the group managed by the distribution control apparatus, when the notification is received in said receiving step.

23. A data distribution control apparatus for distributing image or audio data using a network, comprising:

receiving means for receiving, from one of a plurality of node groups each including one or a plurality of nodes having data transmitting means, data receiving means and relay means, a notification indicating that the distribution control apparatus is selected as an upper node group on the basis of information managed by each source node;

intra-node-group distribution route setting means for setting a transfer route among nodes in the group managed by the distribution control apparatus, when said receiving means receives the notification.

* * * * *

UNITED STATES PATENT AND TRADEMARK OFFICE
CERTIFICATE OF CORRECTION

PATENT NO. : 6,226,673 B1
DATED : May 1, 2001
INVENTOR(S) : Masahiko Yoshimoto

It is certified that error appears in the above-identified patent and that said Letters Patent is hereby corrected as shown below:

Title page, Item [54] and Column 1, lines 1-2,
The title of the invention should read -- DATA DISTRIBUTION METHOD AND APPARATUS, AND COMPUTER PROGRAM --
Item [75], the address of the inventor should read as follows:
-- Masahiko Yoshimoto, Kanagawa-ken, Japan --

Column 7,
Line 31, "or" should read -- for --

Signed and Sealed this

Fifth Day of November, 2002

JAMES E. ROGAN
Director of the United States Patent and Trademark Office